Feb. 11, 1930.                D. W. KLEIN                1,747,117
              METHOD OF MAKING MULTIPLE DIAMETER CUT TOOLS
                          Filed April 1, 1927
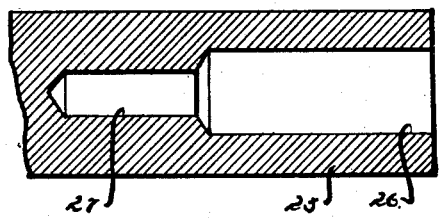
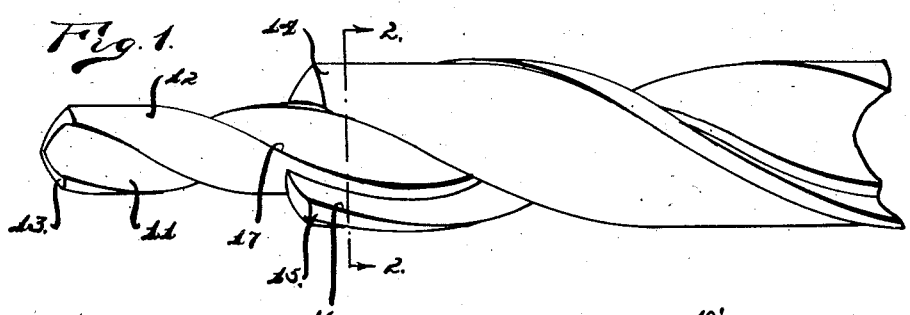
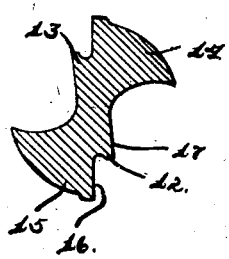
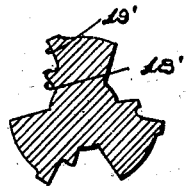
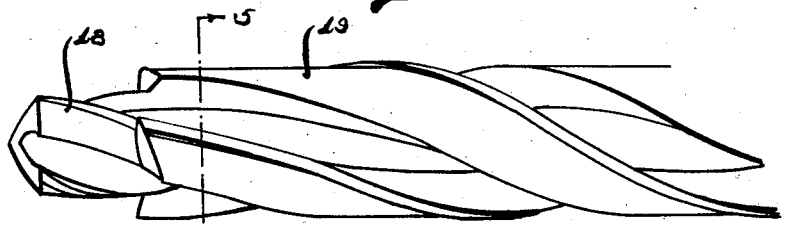
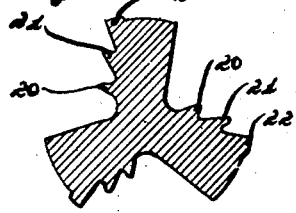
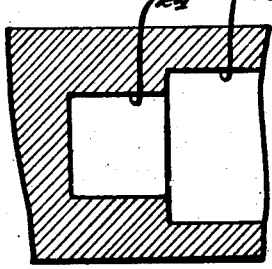
INVENTOR.
Dayton W. Klein.
BY
ATTORNEY.

Patented Feb. 11, 1930

1,747,117

UNITED STATES PATENT OFFICE

DAYTON W. KLEIN, OF DETROIT, MICHIGAN

METHOD OF MAKING MULTIPLE DIAMETER CUT TOOLS

Application filed April 1, 1927. Serial No. 180,105.

My invention relates to a new and useful improvement in a multiple diameter cut tool and particularly a tool adapted for use in drilling, reaming, and boring operations.

It is an object of the present invention to provide a tool of this class having portions of different diameter so that the tool may be used for drilling holes of different diameters at the same stages of the operation at different positions longitudinally of the tool.

It is another object of the present invention to provide a tool of this class which will be simple of structure, economic of manufacture and highly efficient in use.

It is another object of the invention to provide a method of forming a multiple diameter cut tool of this class.

Other objects will appear hereinafter.

The invention consists in the combination and arrangement of parts hereinafter described and claimed.

The invention will be best understood by a reference to the accompanying drawings which form a part of the specification and in which, Fig. 1 is a fragmentary, side elevational view of a tool embodying the invention.

Fig. 2 is a sectional view taken on substantially line 2—2 of Fig. 1.

Fig. 3 is a sectional view of the workpiece showing the work produced by the tool.

Fig. 4 is a fragmentary side elevational view of another type of tool embodying the invention.

Fig. 5 is a sectional view taken on substantially line 5—5 of Fig. 4.

Fig. 6 is a fragmentary sectional view of a workpiece showing the work performed by the tool, and Fig. 7 is a sectional view similar to Fig. 5 of another type of tool.

In the drawings I have illustrated the invention applied to a drill and in Fig. 1 the forward portion 11 of the drill is of a specified diameter. The axial portion of the drill may be considered as the main body and the flutes or extensions 12 and 13, for the purposes of description are termed longitudinal axially extending blades.

In forming the tool, the blades 12 and 13 are originally of the same diameter as are the blades 14 and 15. The tool is then ground off until the blades 12 and 13 are of the desired diameter. In this way there is provided a multiple diameter cut tool, the portion having the blades 12 and 13 serving to cut one diameter and the blades 14 and 15 serving to cut a larger diameter in the workpiece. As shown in Fig. 1 the advancing face of the blade 16 is positioned rearwardly of the advancing face 17 of the blade 12. This is brought out also in Fig. 2, this offsetting of the advancing faces being necessary for the proper operation of the device when used. In Fig. 4 and Fig. 5 I have shown a similar tool with the blades 18 of one diameter or depth and the blades 19 of another diameter or depth. The same arrangement as will appear from Fig. 5 of offsetting the advancing faces is present as already described, the advancing faces 18' being positioned forwardly of the advancing faces 19'. This structure is illustrated to indicate that the number of blades or flutes is optional, the form shown in Fig. 1 and Fig. 2 embodying but a pair of blades and the form shown in Fig. 4 and Fig. 5 possessing three of the blades.

In Fig. 7 I have shown the tool constructed to cut three diameters, the blades 20 cutting one diameter, the blades 21 another, and the blades 22 another. It will also be noted that the same relative position of the advancing faces is maintained in Fig. 7.

In Fig. 6 I have illustrated the workpiece operated upon whereby the bore 23 is drilled and the bore 24 is drilled and faced at its inner end.

The invention may be employed on tools such as reamers, bores, and drills having any desired number of flutes or blades, right or left hand spiral of any degree. The number of steps or cutting diameters on the blades is optional and it is believed evident that the machining of the blades to the desired diameters may be followed or blades of various diameters may be attached to a supporting blade of a constant diameter. All of the cuttings or chips produced by the tool will fall into the space between the main blades regardless of the steps or diameters which serves to remove the chips or cuttings. It is also believed obvious that the invention may be applied to a taper reamer as well as the various tools mentioned. While I have illustrated and described the preferred form of structure, I do not wish to limit myself to the precise form of structure shown, but desire to avail myself of such variations and modifications as may come within the scope of the appended claim.

Having thus described my invention what I claim as new and desire to secure by Letters Patent is:

The method of forming a multiple diameter cut tool of the class described comprising forming on a body blades of the same depth and grinding respective portions of the several blades axially of the main body to different depth and grinding the advancing face of each succeeding depth offset relatively to the advancing face of the adjacent depth.

In testimony whereof I have signed the foregoing specification.

DAYTON W. KLEIN.